United States Patent
Nishikawa et al.

(10) Patent No.: US 8,005,342 B2
(45) Date of Patent: Aug. 23, 2011

(54) DIGITAL CAMERA

(75) Inventors: Masahiko Nishikawa, Nara (JP); Takehiko Kanda, Takatsuki (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 349 days.

(21) Appl. No.: 12/222,202

(22) Filed: Aug. 5, 2008

(65) Prior Publication Data
US 2009/0046193 A1 Feb. 19, 2009

Related U.S. Application Data

(62) Division of application No. 09/784,308, filed on Feb. 16, 2001, now Pat. No. 7,424,207.

(30) Foreign Application Priority Data

Feb. 18, 2000 (JP) .................................. 2000-040423
Feb. 18, 2000 (JP) .................................. 2000-040424

(51) Int. Cl.
*H04N 5/77* (2006.01)
(52) U.S. Cl. ................... 386/227; 386/286; 386/326
(58) Field of Classification Search .............. 386/46, 386/83, 126
See application file for complete search history.

(56) References Cited

U.S. PATENT DOCUMENTS

| 5,153,730 | A | * | 10/1992 | Nagasaki et al. ........ 348/231.6 |
| 5,155,638 | A |   | 10/1992 | Aikawa et al. |
| 5,379,069 | A |   | 1/1995  | Tani |
| 5,576,757 | A | * | 11/1996 | Roberts et al. ............ 348/220.1 |
| 5,933,137 | A | * | 8/1999  | Anderson ................. 715/720 |
| 5,986,700 | A |   | 11/1999 | Wakui |
| 6,449,426 | B1 | * | 9/2002 | Suga et al. ................. 386/117 |
| 2006/0132660 | A1 | * | 6/2006 | Kurumisawa ............. 348/631 |

FOREIGN PATENT DOCUMENTS

| JP | 10-178612   | 6/1998  |
| JP | 11-103436   | 4/1999  |
| JP | 11-239321   | 8/1999  |
| JP | 11-284884   | 10/1999 |
| JP | 2000-354193 | 12/2000 |

* cited by examiner

*Primary Examiner* — Jamie Atala
(74) *Attorney, Agent, or Firm* — Westerman, Hattori, Daniels Adrian, LLP

(57) ABSTRACT

A digital camera includes a signal processing circuit. The signal processing circuit makes signal processing on the camera data read from a camera data area of an SDRAM to produce YUV data for record. A thin-out circuit makes a thin-out processing on the recording YUV data to produce YUV data for display. The display YUV data and the recording YUV data thus produced are written respectively to a display data area and a recording data area of the SDRAM and thereafter processed for display on a display and record to a flash memory. The access speed to SDRAM is 48 MHz and the processing speed of the signal processing circuit and thin-out circuit is 12 MHz. Consequently, the YUV data for display and YUV data for record is written concurrently with reading out of the camera data.

5 Claims, 5 Drawing Sheets

| Cy | Ye | Cy | Ye | Cy |  | Ye | Cy | Ye |
|----|----|----|----|----|--|----|----|----|
| Mg | G  | Mg | G  | Mg |  | G  | Mg | G  |
| Cy | Ye | Cy | Ye | Cy |  | Ye | Cy | Ye |
| Mg | G  | Mg | G  | Mg |  | G  | Mg | G  |
|    |    |    |    |    |  |    |    |    |
| Mg | G  | Mg | G  | Mg |  | G  | Mg | G  |
| Cy | Ye | Cy | Ye | Cy |  | Ye | Cy | Ye |

DIGITAL CAMERA

This application is a divisional application of U.S. Ser. No. 09/784,308, filed Feb. 16, 2001, which claims priority of Japanese Patent Application No. 2000-040423, which was filed Feb. 18, 2000, and Japanese Patent Application No. 2000-040424, which was filed on Feb. 18, 2000, each of which are hereby incorporated by reference in their entirety.

BACKGROUND OF THE INVENTION

1. Field of the Invention

This invention relates to digital cameras and, more particularly, to a digital camera that produces a display image signal for display on a display and a recording image signal for recording to a recording medium on the basis of a camera signal outputted from an image sensor in response to a picture-taking instruction.

2. Description of the Prior Art

An example of a conventional digital camera of this kind is disclosed in Japanese Patent Laid-open No. 239321/1999 [H04N5/92, 5/907] laid open on Aug. 31, 1999. In this prior art, the camera data (RAW data) of a subject image is stored to a camera data area of an SDRAM. Both the display image data for display of a freeze image on a display and the recording image data (thumbnail image data and main image data) for recording to a recording medium are reproduced on the basis of the camera data stored in the camera data area.

Herein, the main image data and the thumbnail image data are both the YUV-type of data. The YUV conversion processes for producing various ones of image data from the camera data are integrated together, and the thumbnail image data is produced by applying a thin-out process to the main image data. On the other hand, despite the display image data is in the YUV type common to the main image data and thumbnail image data, the YUV conversion process for producing display image data is carried out separate from the above YUV conversion process while separately forming a thin-out process. Due to this, in the prior art, there has been a problem of consuming excessive time before completing the process of producing display image data and recording image data. In other words, there has been a problem of consuming excessive time before completing the picture-taking process.

SUMMARY OF THE INVENTION

Therefore, it is a primary object of the present invention to provide a digital camera capable of producing display-image data and recording-image data in a brief time.

Another object of the invention is to provide a digital camera that can carry out a picture-taking process at increased speed.

According to this invention, a digital camera that produces a display image signal for display on a display and a recording image signal for record to a recording medium on the basis of a camera signal outputted from an image sensor in response to a picture-taking instruction, comprises: a first writer for writing the camera signal to a first area of a memory; a reader for reading the camera signal from the first area; a first producer for producing the recording image signal based on the camera signal read out by the reader; a second producer for producing the display image signal based on the recording image signal; a second writer for writing the display image signal to a second area of the memory; and a third writer for writing the recording image signal to a third area of the memory; wherein an access speed to the memory is three times of or greater than a processing speed by the first producer and the second producer.

A recording image signal is produced on the basis of a camera signal read from the first area of the memory, and further a display image signal is produced on the basis of the recording image signal. The recording image signal and the display image signal thus read out are respectively written to the second area and the third area of the same memory. Consequently, it is satisfactory to read a camera signal once from the first area. Meanwhile, the access speed to the memory is three times greater or more than the processing speed by the first producer or second producer. Concurrently carried out are reading out of a camera signal and writing in of display and recording image signals. This reduces the time required for producing display and recording image signals and for writing each image signal to the memory.

In one embodiment of the invention, a buffer memory is to be accessed at a first clock rate and a second clock rate of three times greater or more than the first clock rate, wherein a difference between the access speed to the memory and the processing speed of the first and second producers is absorbed by the buffer memory.

In another embodiment of the invention, the second producer makes a resolution-reducing process on the recording image signal to thereby produce the display image signal.

In still another embodiment of the invention, the memory has a single data input/output port.

In yet another embodiment of the invention, the camera signal is a raw image signal that each pixel has any one color component, and the display image signal and the recording image signal being both YUV-type signals.

In another embodiment of the invention, an outputter outputs the display image signal to the display by reading same from the second area. Also, a recorder records the recording image signal to the recording medium by reading same from the third area.

According to this invention, a digital camera that produces a display image signal for display on a display and main and size-reduced image signals for recording to a recording medium, on the basis of a camera signal outputted from an image sensor in response to a picture-taking instruction, comprises: a first producer for producing the main image signal on the basis of the camera signal; a second producer for producing the display image signal by making a resolution-reducing process on the main image signal; and a third producer for producing the size-reduced image signal by making a resolution-reducing process on the display image signal.

By producing a size-reducing image signal on the basis of the display image signal lower in resolution than the main image signal, the process time is shortened as compared to the case of producing a size-reduced signal from the main image signal. As a result, it is possible to increase the speed of the picture-taking process.

In one embodiment of this invention, the camera signal is a raw image signal that each pixel has any one color component, and the main image signal, the display image signal and the size-reduced image signal being YUV-type signals.

In another embodiment of the invention, a first writer writes the main image signal produced by the first producer to the first memory and a second writer writes the display image signal produced by the second producer to a second memory. A reader reads the display image signal from the second memory and supplying same to the third producer, and a third writer writes the size-reduced image signal produced by the third producer to a third memory.

Preferably, an outputter outputs the display image signal stored in the second memory to the display. On the other hand, a recorder records the main image signal stored in the first memory and the size-reduced image signal stored in the third memory to the recording medium.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a color filter;

DETAILED DESCRIPTION OF THE PREFERRED EMBODIMENTS

Figure 1:
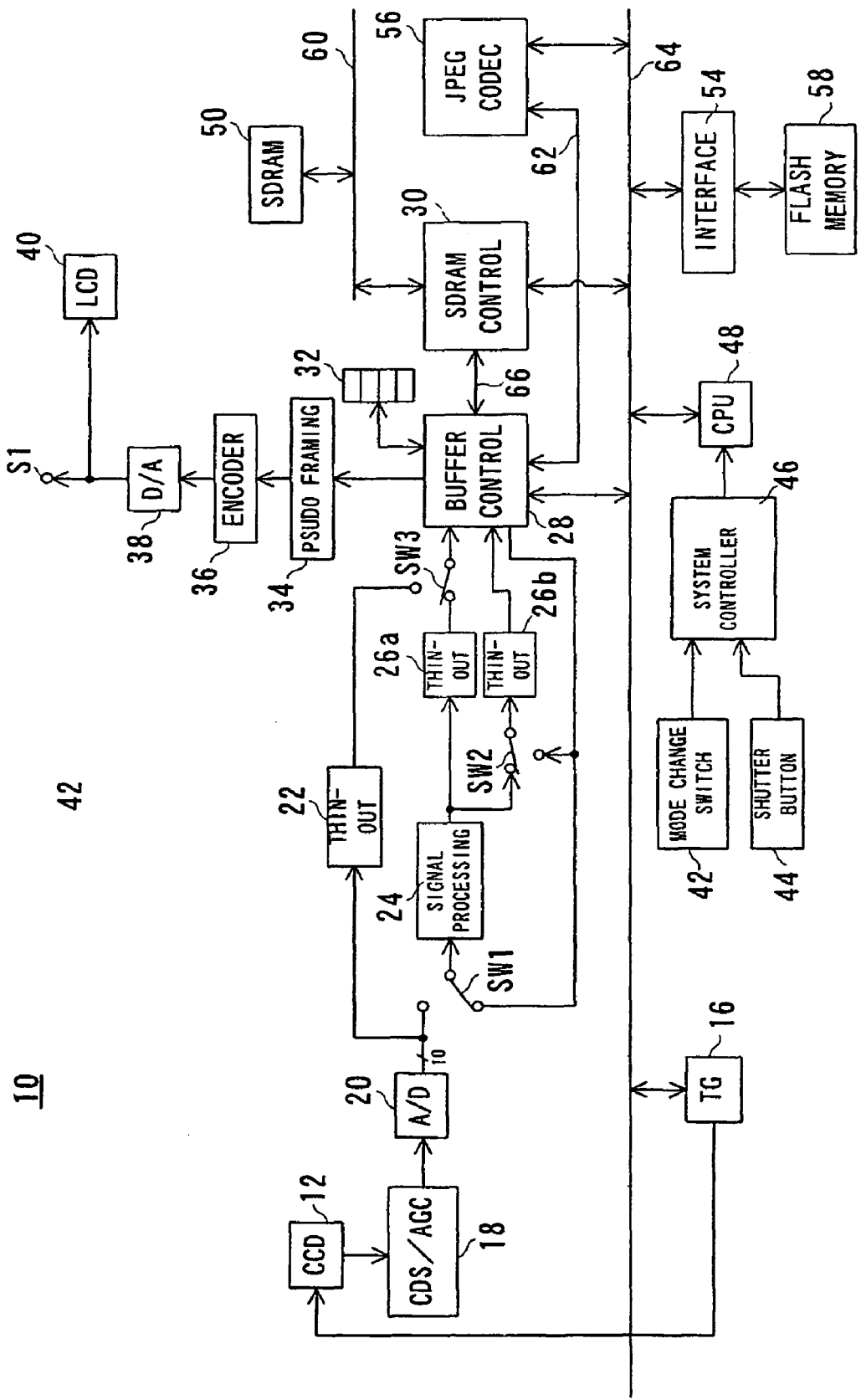
FIG. 1 is a block diagram showing an embodiment of the present invention.

Referring to FIG. 1, a digital camera 10 of this embodiment includes a CCD imager 12. The CCD imager 12 has about 1.20 million pixels, wherein 1280 pixels and 960 pixels exist respectively in a horizontal direction and a vertical direction. It takes a time of 1/7.5 second to read all the lines of a camera signal from the CCD imager. A subject optical image is illuminated onto the light-receiving surface of the CCD imager 12 through the color filter 14 having Cy, Ye, Mg and G arranged in a mosaic form, as shown in FIG. 2.

When an operator switches a mode-change switch 42 to a camera-mode side, a system controller 46 supplies an instruction on a camera mode to a CPU 48. Thereupon, the CPU 48 instructs a timing generator (TG) 16 provided in an ASIC 42 to perform thin-out to display real-time a motion image (through image) of the subject on an LCD 40.

The TG 16 drives the CCD imager 12 by a thin-out read scheme so that a camera signal having the vertical number of lines thinned out to a quarter (raw image signal) is outputted from the CCD imager. If noting 8 lines continuing in the vertical direction, outputted are only pixel signals on a first line having Cy, Ye, ... and a fourth line having Mg, G.... The pixel signals on the other lines are swept away. Consequently, the camera signals of 1280 pixels.times.240 lines outputted from the CCD imager 12 includes alternately the lines of Cy, Ye ... and the lines of Mg, G .... Because the vertical number of lines is thinned out to a quarter, the time required in outputting the camera signal having 1280 pixels.times.240 lines becomes 1/30 of a second.

The camera signal outputted from the CCD imager 12 is subjected to well-known noise removal and level adjustment by a CDS/AGC circuit 18. Then, the camera signal thus processed is converted, at a clock rate of 12 MHz, into digital data (camera data) by an A/D converter 20. When outputting a through-image, a switch SW1 is connected to the A/D converter 20 and the switch SW3 is to a thin-out circuit (zoom circuit) 26a. Furthermore, the thin-out circuit 26a is set in thin-out ratio to horizontally "1/2" and vertically "0".

Consequently, the camera data outputted from the A/D converter 20 is subjected to color separation and YUV conversion by a signal processing circuit 24. The thin-out circuit 26a thins a horizontal number of pixels out of the YUV data outputted from the signal processing circuit 24 to "640", and inputs the YUV data of 640 pixels.times.240 lines to a buffer control circuit 28 through a switch SW3. Incidentally, the CPU 48 switches SW1 and SW3 and sets a thin-out ratio in the thin-out circuit 26a.

Figure 3:
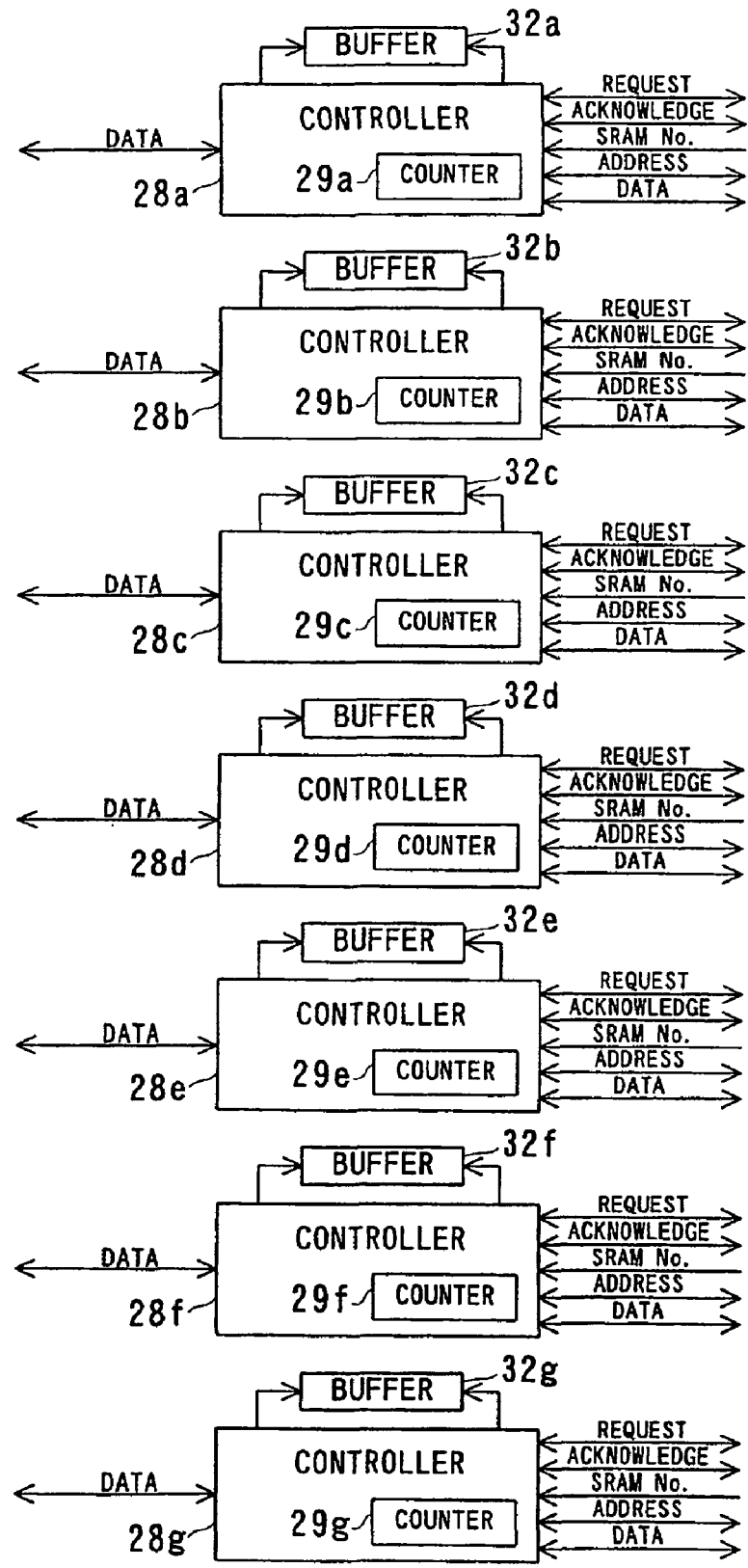
FIG. 3 is a block diagram showing a buffer control circuit and buffer.

The buffer control circuit 28 and buffer 32 is concretely configured as shown in FIG. 3. The buffer control circuit 28 is provided with seven controllers 28a-28g assigned respectively with buffers 32a-32g formed by the SRAM. Also, controllers 28a-28g have respective counters 29a-29g. These counters 29a-29g are incremented at a clock rate of 48 MHz.

In access to the SDRAM 50, each of the controller 28a-28g first outputs an access request signal REQUEST to the SDRAM control circuit 30. The SDRAM control circuit 30 sends back an acknowledge signal ACKNOLEDGE, together with an identification no. (SRAM No.) of any of the buffers 32a-32g, to the controller 28a-28g. Each controller 28a-28g compares the sent-back identification no. with an identification no. of a buffer assigned thereto. Only the controller the both are in agreement is allowed to access the SDRAM 50. In writing, desired data is outputted together with address data to the SDRAM control circuit 30. The desired data is written to the SDRAM 50 by the SDRAM controller 30. In reading, on the other hand, address data is outputted to the SDRAM control circuit 30 so that the desired data can be read from the SDRAM 50 by the SDRAM control circuit 30.

Incidentally, between the controller 28a-28g and the SDRAM control circuit 30, any signal or data transmission and reception is through a bus 66. Meanwhile, a bus 62 or 64 is used in transmission to and reception from a JPEG CODEC 56. Also, the SDRAM 50 has only a single data input/output port.

The YUV data of 640 pixels.times.240 lines outputted from the thin-out circuit 26a is inputted to the controller 28a. Simultaneously, a window signal for defining an effective area for the CCD imager 12 is inputted from the timing generator 16. The controller 28a, when the window signal is in high level, writes the YUV data at a clock rate of 12 MHz to the buffer 32a or reads the YUV data at a clock rate of 48 MHz from the buffer 32a. The controller 28a also receives top address data of a display data area shown in FIG. 5 from the CPU 48 and calculates an YUV-data-write address on the basis of the head address data and count value of the counter 29a. An access request is generated in the above manner. Only when an access is permitted, the YUV data is outputted together with write address data to the SDRAM control circuit 30. Incidentally, because the SDRAM is a memory in a burst transfer scheme, write address data is outputted, for example, once per four addresses.

The SDRAM control circuit 30 writes the input YUV data to a desired address of the SDRAM 50 through the bus 60. That is, the SDRAM control circuit writes four addresses of YUV data into four addresses following the address as represented by the input address data. Also, in response to an input of the next address data, the next four addresses of YUV data are written into the four addresses following the address as represented by the data. The YUV data is written to the display data area shown in FIG. 5. The SDRAM control circuit 30 also executes writing at a clock rate of 48 MHz.

In this manner, accessing the SDRAM 30 does not require address data at all times. It is satisfactorily to provide address data in an intermittent fashion. High speed access is realized by the above characteristics of the SDRAM 30 and the clock rate of 48 MHz.

Figure 4:
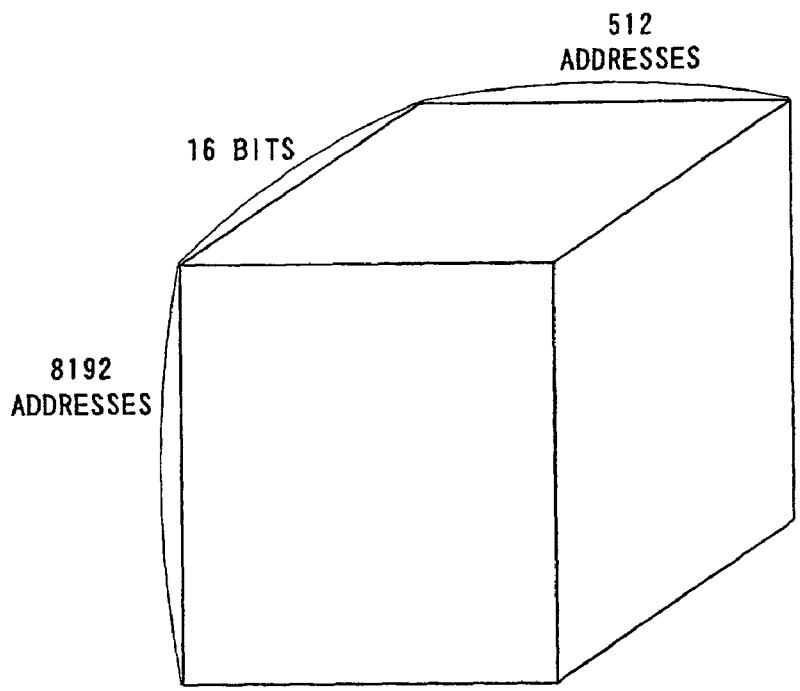
FIG. 4 is an illustrative view showing an SDRAM.
Figure 5:
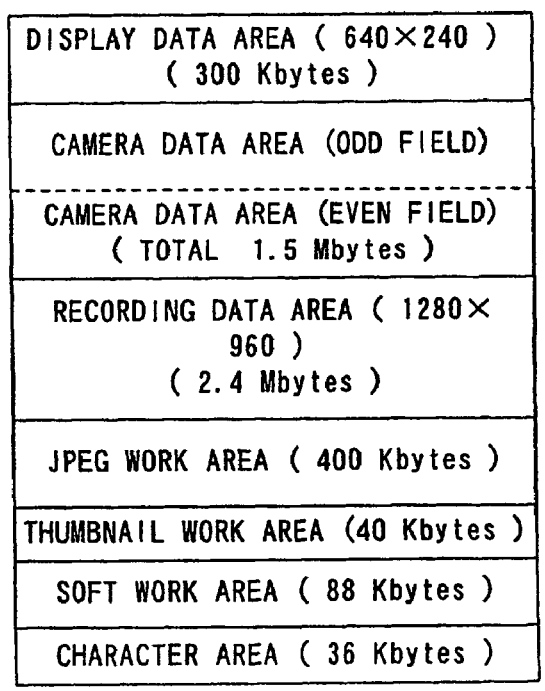
FIG. 5 is an illustrative view showing a mapping state of the SDRAM in a camera mode.

The SDRAM 30, as shown in FIG. 4, has 512 addresses in a column direction (horizontal direction) and 8192 addresses in a row direction (vertical direction), wherein each address is 16 bits. The CPU 48, when a camera mode is selected, makes mapping in the SDRAM 30 as shown in FIG. 5. That is, formed on the SDRAM 30 are a display data area of 300 K bytes, a camera data area of about 1.5 M bytes, a recording data area of 2.4 M bytes, a JPEG data area of 400 K bytes, a thumbnail data area of 40 K bytes, a software work area of 88 K bytes and a character area of 36 K bytes.

The signal processing circuit 24 produces YUV data through so-called 4:2:2 conversion. Because Y data, U data and V data are each 8 bits, the YUV data of 4 pixels has a data amount of 64 bits, i.e. 4 addresses. In average, YUV data is 16 bits (2 bytes) per pixel. Consequently, the YUV data having 640 pixels.times.240 lines outputted from the thin-out circuit 26a has 307200 bytes (300 K bytes). As described above, because the display data area has a capacity of 300 K bytes, the YUV data of 640 pixels.times.240 lines is adequately stored in the display data area.

The YUV data stored in the display data area, when the bus 60 is in open, is read out totally twice by the SDRAM control circuit 30. That is, YUV data in the same is read out twice, in order to produce a through-image having 640 pixels.times.480 lines from the YUV data of 640 pixels.times.240 lines. At this time, reading-out is carried out in response to the address data from the controller 28c shown in FIG. 3. That is, the controller 28c calculates a read address based on top address data of a display data area and a count value of the counter 29c, and inputs calculated read address data once per four addresses to the SDRAM control circuit 30. The SDRAM control circuit 30 reads YUV data from the display data area at a clock rate of 48 MHz, in response to the read address data. The read YUV data is supplied to the controller 28c, and the clock rate is returned to 12 MHz by the use of the buffer 32c.

Figure 6:
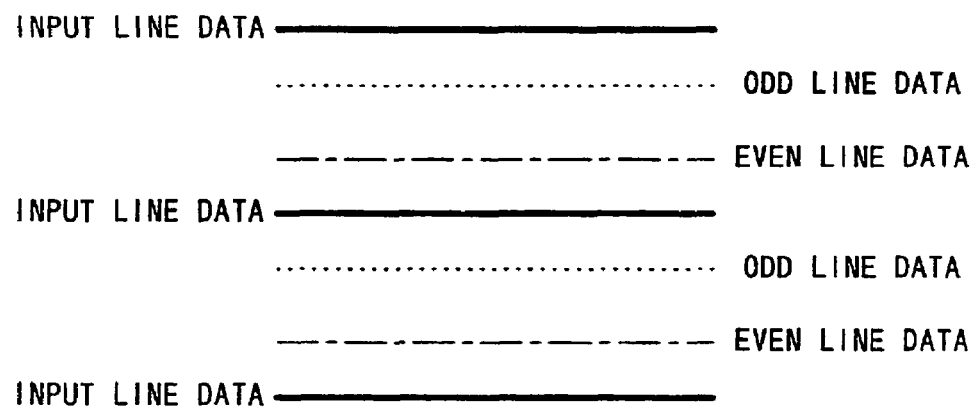
FIG. 6 is an illustrative view showing operation of a pseudo framing circuit.

The YUV data outputted at a clock rate of 12 MHz from the controller 28c is inputted to a pseudo framing circuit 34 where each of the line data is subjected to predetermined weighting. Specifically, the weighting amount on the YUV data inputted in the first half of 1-frame period is taken "0.25", and the weighting amount on the YUV data inputted in the latter half of the 1-frame period is "0.75". Due to this, as shown in FIG. 6, odd-lined data and even-lined data are produced from the respective ones of input line data in a pseudo fashion. The interlace-scan data thus obtained is converted into an analog signal by a D/A converter 38 after passed through the encoder 36. This analog signal, or interlace-scanned YUV signal, is outputted through an output terminal S1 and inputted to an LCD 40. Thus, through images are displayed on the LCD 40.

In a state of displaying a through-image, when the operator presses a shutter button 44, the system controller 46 supplies a picture-taking instruction to the CPU 48. Thereupon, the CPU 48 connects the switch SW1 to the buffer control circuit 28 and the switch SW3 to the thin-out circuit (zoom circuit) 22. The CPU 48 also controls the timing generator 16 to output all the lines of a camera signal in an interlace-scan scheme from the CCD imager 12. Due to this, an interlace-scan camera signal in one scene is outputted from the CCD imager 12 over a period of 1/7.5 of a second. This camera signal is supplied to the A/D converter 20 through the CDS/AGC circuit 18. Elapsing 1/7.5 of a second from pressing of the shutter button 52, the CPU 48 disables the CCD imager 12. Due to this, after pressing the shutter button 52, nothing is obtained other than a 1-scene camera signal.

The all-the-lined camera data outputted from the A/D converter 20 is inputted to the thin-out circuit 22. In this case, the thin-out circuit 22 is set in thin-out ratio at "0" in both the vertical and horizontal directions so that the all-the-lined camera data is supplied as it is to the controller 28a. To the controller 28a, a top address of the camera data area shown in FIG. 5 is loaded in response to operation of the shutter button 52. The controller 28a temporarily stores the input camera data into the buffer 32a similarly to the above, and thereafter supplies it, together with the address data, to the SDRAM control circuit 30. This address data is also produced with reference to the loaded top address data. The camera data and the address data are outputted at a clock rate of 48 MHz to the SDRAM control circuit 30. As a result, the camera data is written to the camera data area at a clock rate of 48 MHz by the SDRAM control circuit 30.

Incidentally, because this camera data is interlace-scan data, odd-field data is stored in the first half of the camera data area while even-field data is in the latter half thereof. That is, an odd-field area and an even-field area formed within the camera data area.

The all-the-lined camera data obtained responsive to operation of the shutter button 44 has 1280 pixels.times.960 lines, wherein each pixel is 10 bits. That is, the all-the-lined camera data possesses a data amount of 1536000 bytes (=1280 pixels.times.960 lines.times.10 bits/8 bits) i.e. 1.5 M bytes, which is stored fully in the camera data area.

Completing the writing of all-the-lined camera data, the SDRAM control circuit 30 executes to read out the camera data in response to address data from the controller 28e. That is, the controller 28e calculates address data on the basis of the address data of the camera data area loaded from the CPU 48 and count value of the counter 29e. In response to the address data, the SDRAM control circuit 30 reads camera data, line by line, alternately from the odd-filed area and the even-field area. This converts the interlace-scan data into progressive scan data.

The progressive scan data thus read is subject to a frequency conversion process (48 MHz 12 MHz) by the controller 28e, and then supplied to the signal processing circuit 24 through the switch SW1. The signal processing circuit 24 applies color separation and YUV conversion to the input progressive scan data, i.e. Cy, Ye, Mg and G camera data, thereby producing YUV data having 1280 pixels.times.960 lines (major YUV data or YUV data for record).

At the time that all the lines of camera data have been written to the camera data area, the CPU 48 connects the switch SW2 to the signal processing circuit 24 and the switch SW3 to the thin-out circuit 26a. The CPU 48 also sets the thin-out ratio of the thin-out circuit 26a to "1/2" and "1/4" respectively in horizontal and vertical directions, and thin-out ratio of the thin-out circuit (zoom circuit) 26b to "0" in both the horizontal and vertical directions.

Due to this, YUV data (YUV data for display) having 640 pixels.times.140 lines is outputted from the thin-out circuit 26a. The display YUV data thus outputted is inputted to the controller 28a through the SW3. The controller 28a is loaded with the top address of the display data so that the display YUV data is written to the display data area in the similar manner to that of the through-image outputting.

Figure 7:
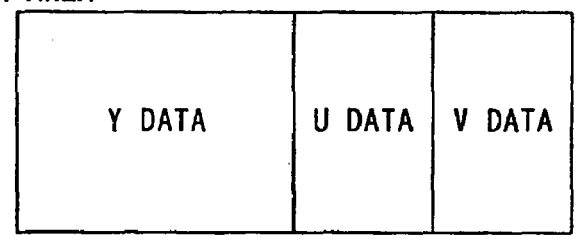
FIG. 7 is an illustrative view showing a record data area formed in the SDRAM.

On the other hand, the thin-out circuit 26b outputs as it is the major YUV data inputted through the switch SW2. This major YUV data is inputted to the controller 28b. The controller 28b is given a top address of the recording area shown in FIG. 5 from the CPU 48. The controller 28b calculates a write address on the basis of the top address data thus provided and count value of the counter 29b. The major YUV data and write address data is outputted at a clock rate of 48 MHz to the SDRAM control circuit 30. The major YUV data is written to the recording data area at a clock rate of 48 MHz by the SDRAM control circuit 30. Specifically, taking into consideration a JPEG process hereinafter referred, Y data, U data and V data are individually stored as shown in FIG. 7. The display YUV data having 640 pixels.times.240 lines is 300 K bytes, and hence the major YUV data having 1280 pixel.times.960 lines is 2.4 M bytes. Accordingly, the major YUV data is stored fully in the recording data area.

Incidentally, the display YUV data and the major YUV data are simultaneously outputted from the thin-out circuits 26a and 26b, and the write processes to the display data area and the recording data area are concurrent with each other.

Completing the writing of the display YUV data and major YUV data, the controller 28c reads the display YUV data out of the display data area in the similar manner to that of through-image outputting, and outputs it to a pseudo framing circuit 34. This displays, on an LCD 40, an image at the time of operating the shutter button 52, i.e. a freeze image same as the recorded image.

Also, at a time of completing the writing of the display YUV data and major YUV data, the CPU 48 connects the switch SW2 to the buffer control circuit 28 and sets the thin-out ratio of the thin-out circuit 26b to "1/4" and "1/2" respectively in the vertical and horizontal directions. The display YUV data read out by the controller 28c is supplied only once to the thin-out circuit 26b through the SW2 and subjected to a thin-out process, besides outputted to the pseudo framing circuit 34. As a result, thumbnail YUV data having 160 pixels.times.120 lines is produced on the basis of the display YUV data.

The thumbnail YUV data of 12 MHz outputted from the thin-out circuit 26b is supplied to the controller 28b. At this time, the controller 28b is loaded with a top address of the thumbnail work area so that the controller 28b calculates a write address on the basis of the loaded top address data and count value of the counter 29b. Then, the thumbnail YUV data is outputted together with write address data to the SDRAM control circuit 30. The thumbnail YUV data is supplied at a clock rate of 48 MHz to the SDRAM control circuit 30. The SDRAM control circuit 30 writes the supplied thumbnail YUV data to the thumbnail work area, according to the write address data. The thumbnail YUV data having 160 pixels.times.120 lines is 37.5 K bytes, and hence the thumbnail YUV data is stored to the 40 K-byte thumbnail work area without problem.

The controller 28f generates read address data on the basis of the top address of the recording area loaded from the CPU 48 and count value of the counter incremented at a clock rate of 48 MHz. The SDRAM control circuit 30 reads Y data, U data and V data, block by block (8 pixels.times.8 lines), from the recording data area according to the read address data from the controller 28f. The Y data, the U data and the V data are separately stored as shown in FIG. 7, wherein Y:U:V=4:2:2. Accordingly, the Y data is first read out twice by one block per time. That is, Y data is read out twice successively. Next, U data and V data are read out block by block.

This read process is repeatedly executed by the controller 28f and SDRAM control circuit 30. The read-out block data is subjected to a frequency conversion process (48 MHz.fw-darw. 12 MHz) in the controller 28f and thereafter inputted to a JPEG CODEC 56 through the bus 62. The JPEG CODEC 56 is repeatedly inputted by block data in the order of Y data, Y data, U data and V data. The JPEG CODEC 56 makes a compression process on the Y data, U data and V data, block by block, according to the JPEG format. Each time 1-block compression process has been completed, compressed YUV data is inputted to the controller 28g through the bus 64.

The controller 28g is loaded by a top address of a JPEC work area shown in FIG. 6. The controller 28g calculates a write address of the compressed YUV data based on the top address data. The calculated write address data is outputted, together with the compressed YUV data inputted from the JPEC CODEC 56 and subjected to frequency conversion (12 MHz 48 MHz), to the SDRAM control circuit 30. The compressed YUV data is written to the JPEG work area at a clock rate of 48 MHz by the SDRAM control circuit 30.

Because the JPEG work area has a capacity of 400 K bytes, the compressed YUV data can be stored to the JPEG work area without problem if the JPEG CODEC 56 has a compression ratio of 1/6 or smaller.

Completing the writing of the compressed YUV data to the JPEG work area, the CPU 48 reads thumbnail YUV data from the thumbnail work area and compressed YUV data from the camera data area through the SDRAM control circuit 30. The compressed YUV data and thumbnail YUV data thus read out is recorded to the flash memory 54 through the interface 54.

As can be understood from the above explanation, the controllers 28a-28g have the following role. That is, the controller 28a writes the data inputted through the switch SW2 to the SDRAM 50. The controller 28b writes the data outputted from the thin-out circuit 26b to the SDRAM 50. The controller 28c reads the data from the display data area. The controller 28d reads character data from a character area shown in FIG. 5. The controller 28e reads data from the camera data area. The controller 28f reads the to-be-compressed data from the DRAM 50 and inputs it to the JPEG CODEC 56. The controller 28g receives the data compressed by the JPEG CODEC 56 and writes it to the SDRAM 50.

According to this embodiment, the signal processing circuit applies processes, such as color separation and YUV conversion, to the camera data read from the SDRAM camera data area, to thereby produce major YUV data. The thin-out circuit subjects the major YUV data to a thin-out process (resolution-reducing process) thereby producing display YUV data. The display YUV data and major YUV data thus produced is written to the display data area and the recording data area of the SDRAM. The display YUV data is thereafter read from the display data area and subjected to display process by the pseudo framing circuit and encoder, and subjected to thin-out process (resolution-reducing process) by the thin-out circuit. When thumbnail YUV data is produced by the thin-out process, the thumbnail YUV data is written to the thumbnail work area. The major YUV data stored in the recording data area and the thumbnail YUV data stored in the thumbnail work area are thereafter recorded to the flash memory.

The access speed to the SDRAM is 48 MHz and the processing speed by the signal processing circuit and thin-out circuit is 12 MHz. This difference in speed is absorbed by the buffer memory. Consequently, the reading out of the camera data and the writing of the display YUV data and major YUV data to the SDRAM area made on current. As a result, it is possible to reduce the time required for producing display data and major data and writing the produced YUV data to the SDRAM.

Meanwhile, resolution decreases in the order of major YUV data, display YUV data and thumbnail YUV data. Due to this, the producing of thumbnail YUV data from display YUV data is shorter in process completion time than the producing of thumbnail YUV data from major YUV data. As a result, it is possible to reduce the time of from operating the shutter button to a completion of recording.

Incidentally, this embodiment is formed in SDRAM with a recording data area to store 1-frame major YUV data and a JPEG work area in store 1/frame compressed YUV data so that all the compressed YUV data produced by JPEG compression is stored in the JPEG work area. However, JPEG compression process may be made in the similar manner to that of the conventional art (Japanese Patent Laid-open No. 239321/1999).

That is, the producing process of major YUV data based on camera data may be made on an 8-line basis, the produced 8-line major YUV data be stored in 40 K-byte JPEG work area and the compressed YUV data produced based on the 1-line major YUV data be stored in the order starting from a top of the camera data area. In this case, the producing process of display YUV data based on major YUV data is also made an 8-line basis, thereby almost simultaneously completing the producing process of display YUV data and the compression process of major YUV data. Also, the producing process of thumbnail YUV data is made after completing the producing process of display YUV data.

Also, although this embodiment used the CCD-type image sensor, it is needless to say that an image sensor of a CMOS type may be used in place thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera comprising:
   a first producer which produces a first recording image having a first resolution on the basis of a raw image of an objective scene captured in response to a capturing instruction, said first producer including a converter which converts said raw image signal into a YUV format, and said first recoding image being of said YUV format;
   a second producer which produces a displaying image having a second resolution lower than said first resolution by making a resolution-reducing process on said first recording image;
   a third producer which produces a second recording image having a third resolution lower than said second resolution by making a resolution-reducing process on said displaying image, said third producer including a size-reducer which makes a size-reducing process on said displaying image, and said second recording image being a size smaller than a size of said displaying image;
   an outputter which outputs to a display monitor said displaying image produced by said second producer; and
   a recorder which records to a recording medium said first recording image and said second recording image respectively produced by said first producer and said third producer.

2. A digital camera according to claim 1, wherein the raw image is an image that each pixel has any one color component.

3. A digital camera according to claim 1, further comprising:
   a first writer which writes said first recording image to a first memory area;
   a second writer which writes said second displaying image to a second memory area;
   a reader which reads said displaying image stored in said second memory area so as to supply said displaying image to said third producer; and
   a third writer which writes said second recording image produced by said third producer to a third memory area.

4. A digital camera according to claim 1, wherein said second producer carries out a producing process in parallel with a producing process of said first producer, and said third producer carries out a producing process after each of said first producer and said second producer has carried out the producing process.

5. A digital camera according to claim 3, wherein said second producer carries out a producing process in parallel with a producing process of said first producer, and said third producer carries out a producing process after each of said first producer and said second producer has carried out the producing process.

* * * * *